(12) United States Patent
Kraus et al.

(10) Patent No.: US 7,426,789 B2
(45) Date of Patent: Sep. 23, 2008

(54) UNIVERSAL MEASURING APPARATUS AND ASSOCIATED METHODS

(75) Inventors: Andrew Patrick Kraus, Melbourne, FL (US); David Michael Peltz, Melbourne, FL (US)

(73) Assignee: Engineered Devices & Solutions, LLC, Melbourne, FL (US)

( * ) Notice: Subject to any disclaimer, the term of this patent is extended or adjusted under 35 U.S.C. 154(b) by 59 days.

(21) Appl. No.: 11/669,555

(22) Filed: Jan. 31, 2007

(65) Prior Publication Data
US 2007/0119064 A1    May 31, 2007

Related U.S. Application Data (63) Continuation-in-part of application No. 10/032,435, filed on Dec. 31, 2001, now Pat. No. 7,191,537.

(51) Int. Cl.
*G01D 21/00* (2006.01)
*G01B 5/14* (2006.01)

(52) U.S. Cl. .......................................... 33/520; 33/783

(58) Field of Classification Search .................. 33/520, 33/543, 544.5, 544.6, 555.1, 670, 671, 672, 33/676, 783, 806
See application file for complete search history.

(56) References Cited

U.S. PATENT DOCUMENTS

| | | | |
|---|---|---|---|
| 2,780,874 A * | 2/1957 | Puckett | 33/520 |
| 2,826,820 A * | 3/1958 | Zelnick | 33/544.6 |
| 3,173,211 A * | 3/1965 | Williams | 33/555.1 |
| 3,762,057 A * | 10/1973 | Kaifesh | 33/544.6 |
| 4,682,420 A * | 7/1987 | Teets | 33/520 |
| 4,766,675 A | 8/1988 | Liu | |
| 4,848,757 A * | 7/1989 | De Fazio | 33/520 |
| 5,172,484 A | 12/1992 | Triola | |
| 5,616,917 A | 4/1997 | Dai | |
| 5,669,150 A | 9/1997 | Guertin et al. | |
| 6,076,270 A | 6/2000 | Figliuzzi | |
| 6,240,646 B1 | 6/2001 | Ronnmark et al. | |
| 6,381,861 B1 * | 5/2002 | Deterling | 33/555.1 |
| 6,510,618 B2 | 1/2003 | Tomiser, Jr. et al. | |
| 6,959,573 B2 | 11/2005 | Matsumoto et al. | |
| 7,191,537 B2 * | 3/2007 | Kraus et al. | 33/520 |
| 2005/0235511 A1 * | 10/2005 | Tkachyk | 33/555.1 |

* cited by examiner

*Primary Examiner*—G. Bradley Bennett
(74) *Attorney, Agent, or Firm*—Mark R. Malek, Esquire; Zies Widerman; Sutch & Malek (57) ABSTRACT

A measuring apparatus for measuring an object includes a base member including a portion having a medial cavity and an extendible member that slidably engages the medial cavity of the base member. The extendible member includes a medial member having a mid point indicator defined by an elongate medial passageway, and a point locator defined by a passageway formed through an end portion thereof. The extendible member also includes a pair of opposing flexible members connected to the medial member. Each one of the pair of opposing flexible members have point locators defined by passageways formed through end portions thereof. The measuring apparatus also includes an intersection member connected to the point locaters on the pair of opposing flexible members, and a plurality of sets of measurement marks carried by at least one of the base member and the extendible member relating to a predetermined measurement of the object to be measured.

20 Claims, 10 Drawing Sheets

UNIVERSAL MEASURING APPARATUS AND ASSOCIATED METHODS

RELATED APPLICATIONS

The present application is a continuation-in-part of U.S. patent application Ser. No. 10/032,435, filed on Dec. 31, 2001 now U.S. Pat. 7,191,537 by the inventors of the present application and titled "Method and Apparatus for Locating the Center of a Circle".

FIELD OF THE INVENTION

The present invention relates to the field of measuring devices and, more particularly, to the field of universal measuring apparatus suitable for use to obtain several different measurements, and related methods.

BACKGROUND OF THE INVENTION

The art of locating and measuring aspects various objects can be cumbersome, usually involves multiple steps with multiple tools that require the use of both hands, and for some measurements, can be very difficult. The art of locating the center of a circle has been greatly simplified to be a one-handed single step operation by the current invention. It would be of great benefit to provide similar simplifications for how to measure, locate, and draw other aspects of objects as well. Particular areas of need are: measure the size of a circle, distance between two points, depth of a cavity, and the angle between two lines; locate the midpoint between two points, and draw a circle of a desired size.

Perhaps the most common method to determine the size of a circle is to first accurately determine the diameter of the circle. One may use a compass and a ruler by draw intersecting arcs on the circle and drawing a straight line with the ruler between the intersections to create a diameter line that can then be measured. A center finding tool, such as the combination square that consists of a 90 degree angle portion and straight edge configured to hold the straight edge along the diameter of the circle when 90 degree portion is held against the circle edge, may also be used to find the diameter of a circle. With both of these methods however, one must then measure the length of the diameter to determine the size of the circle. These common methods require the use of multiple tools and require multiple steps.

For measuring the angle between two lines, a protractor is the most common tool. The typical method to measure the angle between two lines is by use of a protractor. In certain cases, a ruler must also be used to draw additional line extensions to complete the measurement. The method is a three step process: a) place the base of the protractor along the first line, b) slide the protractor along the line until the center point of the protractor is at the intersection of the second line and, c) read where the second line intersects the scale on the protractor. If the lines do not intersect, some means of extending or projecting the lines to their point of intersection must be used. In many cases, the means can be a ruler placed co-linear with one of the lines where an extension can be drawn to the other line creating the point of intersection. The state of the art has been advanced by Liu, U.S. Pat. No. 4,766,675 which resolves a majority of the non-intersecting line situation as the apparatus relies on co-linearly aligning both lines such that the point of intersection is not required to determine the angle between the lines. While an improvement to the state of the art, the Liu apparatus generally requires two hands for operation. In the most recent state of the art, Figliuzzi, U.S. Pat. No. 6,076,270, also resolves the non-intersection problem and does so with an apparatus that hingedly connects vertical plates with a frame that allows one handed operation to measure angles.

For many purposes, locating the midpoint between two points is more useful than measuring the distance between the points. For instance, there is great need to fold, cut, or divide something in half. The most common method used typically requires four steps: a) measure the distance across the item to be folded, cut, or divided, with a ruler, b) manually calculate half of that distance, c) locate the new halved distance on the ruler, and d) mark the half point of the item. In addition to being cumbersome and time consuming to complete four steps, the step of calculating the half distance becomes particularly difficult when the distance across the item has a fractional component. Calculating the half distance in this case requires complicated fractional division.

SUMMARY OF THE INVENTION

In view of the foregoing background, it is therefore an object of the present invention to provide a universal measuring apparatus having the ability to measure the size of a circle, the distance between two points, the depth of a cavity, and the angle between two lines. It is also an object of the present invention to provide a universal measuring apparatus capable of locating the midpoint between two points. It is also an object of the present invention to provide a universal measuring apparatus adapted to be used to draw a circle of a desired size.

These and other objects, features, and advantages in accordance with the present invention are provided by a measuring apparatus for measuring an object. The measuring apparatus comprises a base member including a portion having a medial cavity, and a point locator defined by a passageway formed through an end portion thereof. The measuring apparatus also includes an extendible member that slidably engages the medial cavity of the base member.

The extendible member comprises a medial member having a mid point indicator defined by an elongate medial passageway, and a point locator defined by a passageway formed through an end portion thereof. The extendible member also includes a pair of opposing flexible members connected to the medial member. Each one of the pair of opposing flexible members have point locators defined by passageways formed through end portions thereof. The extendible member also includes an intersection member connected to the point locators on the pair of opposing flexible members.

The measuring apparatus includes a plurality of sets of measurement marks carried by at least one of the base member and the extendible member relating to a predetermined measurement of the object to be measured.

The predetermined measurement may be a distance between two points. The measurement marks may relate to length and the distance between two points may be indicated by the measurement mark when the opposing point locators on the flexible members are aligned with the respective two points. The predetermined measurement may also be a size of a circle. In that case, the measurement marks may relate to the size of the circle, and the size of the circle may be indicated by the measurement mark when the point locator on the base member and the opposing point locators on the flexible members are aligned with an outer edge of the circle.

The predetermined measurement may further be a location of a center of a circle. In such a case, the center of the circle may be indicated by the point locator on the medial member when the point locator on the base member and the opposing point locators on the flexible members are aligned with an outer edge of the circle.

The predetermined measurement may still further be a location of a midpoint between two points. The midpoint between the two points may be indicated by an intersection between the intersection member and the mid point indicator when the point locators on the flexible members are aligned with the respective two points. The predetermined measurement may also be a depth of a cavity. Accordingly, the measurement marks may relate to the depth of the cavity, and the depth of the cavity may be indicated by the measurement marks when the end of the medial member is touching the bottom of the cavity and the opposing point locators on the flexible members are aligned with the outer edge of the cavity.

The intersection member may be a string of elastic material held in tension. More particularly, the measuring apparatus may comprise opposing spring members carried by the base member and connected to end portions of the string of elastic material. The measuring apparatus may also include a plurality of pulleys carried by the base member and the extendible member. The string of elastic material may engage the plurality of pulleys to maintain tension on the string of elastic material as the extendible member slidably engages the base member.

The pair of opposing flexible members may include a first flexible member that is fixedly connected to the base member, and a second flexible member that is selectively extended with the medial member. The measuring apparatus may also include a lock member for fixing the first flexible member to the base member.

The predetermined measurement is an angle between two lines. The measurement marks may relate to the angle between two lines, and the angle between the two lines may be indicated by the measurement marks when the point locator on the first flexible member is aligned with a portion of a first one of the two lines so that the intersection member is positioned parallel with the first one of the two lines, and the point locator on the second flexible member is aligned with a portion of the second one of the two lines so that the intersection member is parallel with the second line.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

The novel method consists of setting a first reference point at the edge of the circle to be measured and allowing a single continuous adjustment to be made which aligns at least two other points with the edge of the circle where such adjustment positions another point at the center of the circle by way of a mechanism that maintains accurate spatial relationship of all of the points.

The three mechanical embodiments described below show general types of apparatus that practice the novel method. One skilled in the art will appreciate, that many other configurations of these type apparatus can also practice the invention and still be within the spirit and scope of the claims. It will also be recognized by one skilled in the art that such apparatus may be automated by Electro-mechanical means. Positioning and maintaining the spatial relationship of the points may be performed by a motor or other actuator controlled by a microprocessor. The points that are positioned at the edge of the circle may be photo-detectors or other electronic indicators that provided signals to the microprocessor. The microprocessor would use this information to accurately position the edge locators and center indicator. This automated practice of the invention is also within the spirit and scope of the claims.

Figure 1A:
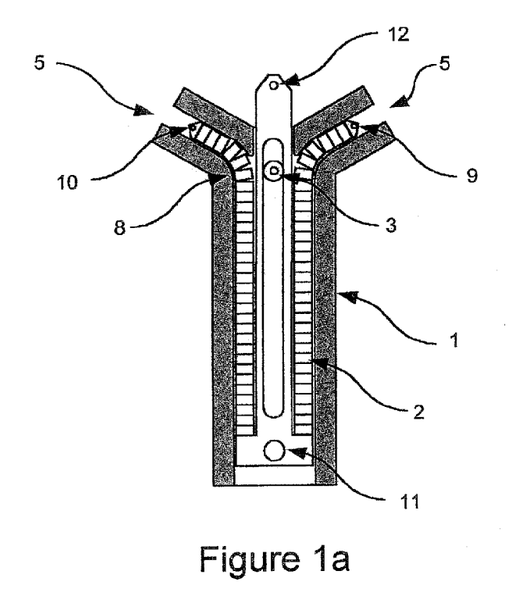
FIG. 1a illustrates all of the parts of the preferred embodiment in their assembled configuration.

FIG. 1a shows the preferred exemplary mechanical embodiment of the invention. It is comprised of two general parts, a base member 1, shown by itself in FIG. 1b, and an extendable member 2, shown by itself in FIG. 1c.

Figures 1B, 1C:
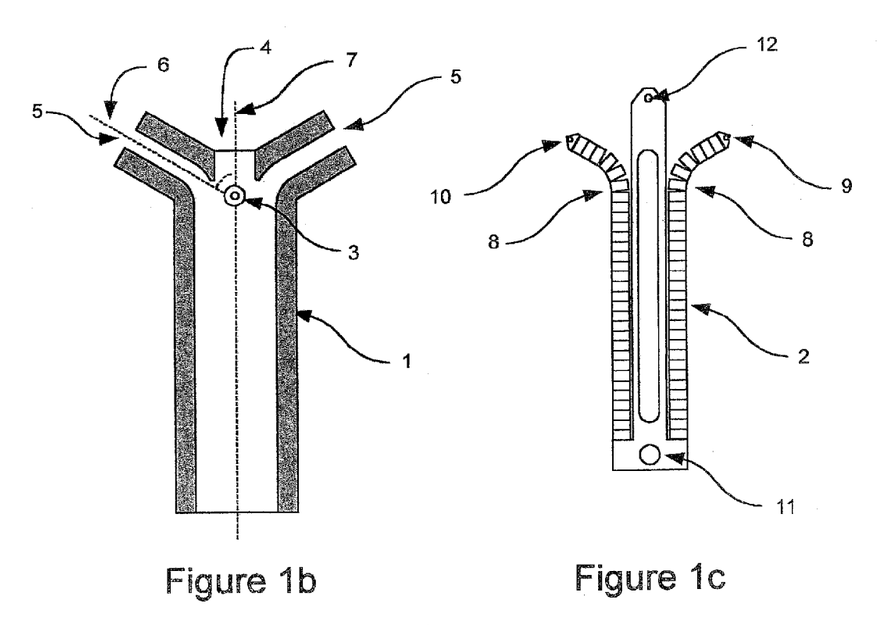
FIG. 1b shows one of the two components of the preferred embodiment.
FIG. 1c shows the second of the two components of the preferred embodiment.

Base member 1 has a pivot post 3 about which it can rotate freely. The pivot post 3 extends through the base member 1 and has an axial hole, is transparent, or has other means that allows the edge of the circle to be seen through the post. The bottom of pivot post 3 may be anti-slip and/or notched for use with a flat circle or end of a cylinder where such a notch is designed to align the edge of the cylinder with the center of the post. The center of the pivot post 3 establishes the first reference point on the edge of the circle to be measured. Base member 1 has a longitudinal cavity 4 running its length with lateral cavities 5 projecting at 60 degrees from either side of it. The lateral cavities are oriented such that the line 6 that bisects the lateral cavities 5 intersects the line 7 that bisects the longitudinal cavity 4 at the center of the pivot post 3 at 60 degrees. The lateral cavities 5 have curved surfaces as they intersect the longitudinal cavity 4 to smoothly redirect the flexible portions of the extendable member 2 as will be described later. The cavities in the base member 1 are sized to accept the extendible member 2 with close but non-interfering tolerance.

The extendible member 2 consists of a center solid longitudinal portion that has a longitudinal slot providing clearance for the pivot post 3 and longitudinal flexible portions 8 on either side. The flexible portions 8 are constructed such that they are normally straight yet can be redirected by the walls of the lateral cavities 5 as they move through them. After being redirected 60 degrees by and exiting from the lateral cavities 5, the flexible portions 8 return to a straight and rigid state. The flexible portions 8 of the extendable member 2 need only be flexible in one degree of freedom in order to be redirected the 60 degrees. Many embodiments of a flexible member with one degree of freedom may be employed such as the use of a tight spring or elastomeric material. An exemplary embodiment shown here is the use of solid segments affixed to the convexing side of a thin flexible material such as spring steel that will bend yet return to straight when the bending force from the walls of the lateral cavities 5 is not in effect. Holes, arrows, or other points of registration are located at the free end of the flexible portions 8 and are the circle edge locators 9 and 10. The circle edge locator 9 establishes the second reference point on the edge of the circle and edge locator 10 establishes the third. An adjust knob 11 or other means to allow the extendable member to be moved relative to the base member 1 is located at the posterior end of the extendable member 2. A hole, arrow, or other means of registration is located at the anterior end of the extendable member 2, and is the circle center indicator 12. With the circle center indicator 12 being a hole; a pencil, stylus, or other marking device may be inserted to mark just the center of the circle when the pivot post 3 and circle edge locators 9 and 10 are positioned at the edge of the circle.

The operation of this embodiment is as follows: The pivot post 3 is place at the edge of a flat circle to be measured or against the edge of a cylinder to be measured. The operator may then hold the pivot post 3 in position by pressing it against the circle with a thumb. Using the thumb and forefinger of the other hand, the adjust knob may be pushed or pulled to extend or retract the extendable member 2, as well as rotate the combined base member 1/extendable member 2 assembly. As the extendable member 2 is pushed toward the anterior end of the base member 1, the flexible members are forced outward at 60 degrees by the walls of the lateral cavities 5. The center solid longitudinal portion is extended out of the longitudinal cavity 4 by this same action. The push and/or pull, and rotation is performed until the circle edge locators 9 and 10 are both positioned at the edge of the circle. When this alignment occurs, the circle center indicator 12 is precisely at the center of the circle.

Figure 2A:
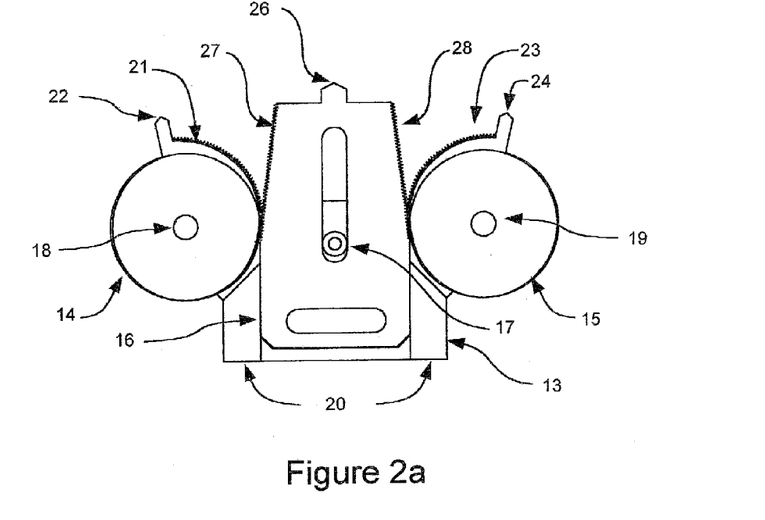
FIG. 2a illustrates all of the parts of a second embodiment in their assembled configuration.

A second embodiment, shown in FIG. 2a, is another apparatus that implements the present novel method of finding the center of a circle. This embodiment consists of the individual components shown in FIG. 2b: a base member 13, left rotatable arm 14, right rotatable arm 15, and an extendable member 16.

Figure 2B:
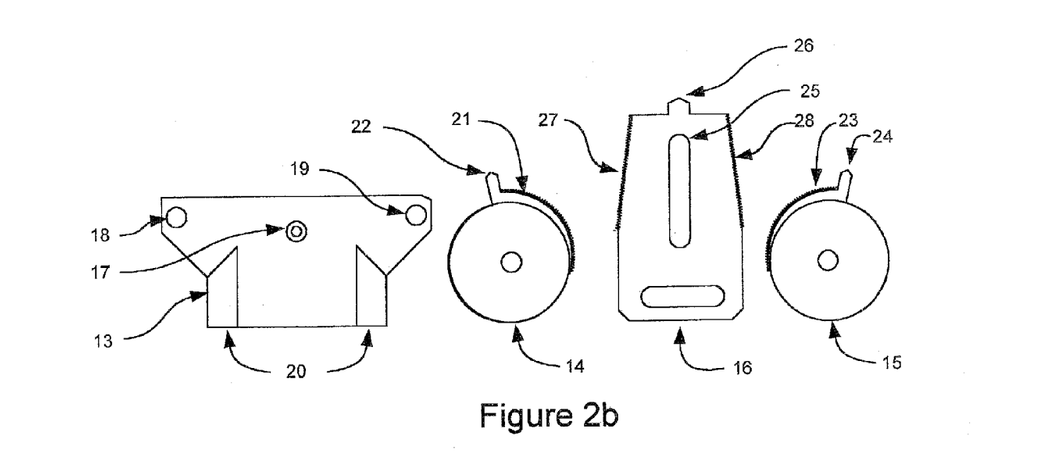
FIG. 2b shows the four components of the second embodiment separated for clarity.

The base member 13 has a pivot post 17 about which it can rotate freely. The center of the pivot post 17 establishes the first reference point on the edge of the circle to be measured. The base member 13 also has a left rotatable arm pivot post 18 and a right rotatable arm pivot post 19 and extendable member guides 20.

The left rotatable arm 14 has complex curve gear teeth 21 and edge of circle locator 22. The right rotatable arm 15 is a mirror copy of the left rotatable arm 14 and has complex curve gear teeth 23 and edge of circle locator 24.

The extendable member 16 has a longitudinal slot 25 that accommodates the base member pivot post 17, and has a circle center locator 26 located at its anterior end. An adjust knob is located at the anterior end of the extendable member 16. On the left side of the anterior edge of the extendable member 16 is complex curve gear teeth 27. On the right side of the anterior edge of the extendable member 16 are complex curve gear teeth 28.

When assembled as in FIG. 2a, the rotatable arms 14 and 15 are located on and may rotate about pivot posts 18 and 19 respectively. The extendable member 16 is located between the extendable member guides 20. The extendible member complex curve gear teeth 27 and 28 engage the rotatable arms' complex curve gear teeth 21 and 23 respectively. The shape of the complex curve gear teeth 21 on the left rotatable arm 14 and the shape of the complex curve gear teeth 27 on the right side of the extendable member 16 are complimentary and have a geometry that results in continuous meshing of the gear teeth where the left rotatable arm circle edge locator 22 rotates to the edge of a given circle when the extendible member 16 is moved to where the circle center indicator 26 is at the center of the given circle when the pivot post 17 is also on the edge of the circle. The complex curve gear teeth 28 on the right rotatable arm 15 and the complex curve gear teeth 28 on the right side of the extendable member 16 mesh in the same fashion. An infinite number of complex curve geometry's will satisfy this relationship and depend on the distance from the center of the rotatable member to the edge locator and the position of the center of the rotatable member relative to the center of the pivot post.

Operation of this apparatus is similar to that of the preferred embodiment. The pivot post 17 is placed on the edge of a circle to be measured. The extendable member 16 is then pushed or pulled and rotated about pivot post 17 until the right and left rotatable circle edge locators, 22 and 24, are positioned at the edge of the circle. When this occurs, the circle center indicator 26 is at the center of the circle.

Figure 3:
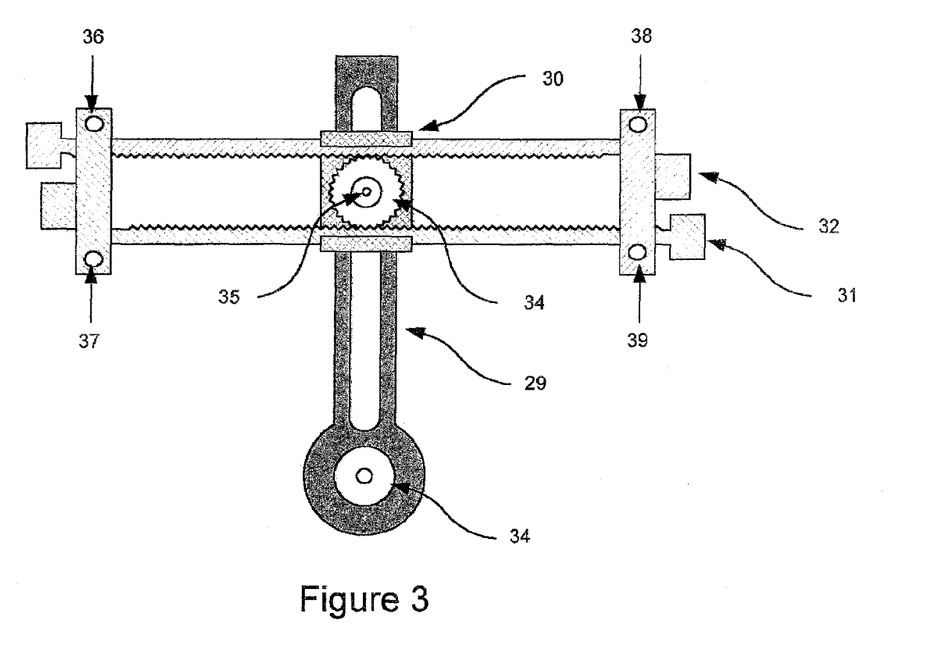
FIG. 3 illustrates all of the parts of a third embodiment in their assembled configuration.

A third embodiment is yet another apparatus that implements the present novel method of finding the center of a circle. This embodiment, shown in FIG. 3, consists of a base member 29, a rack and pinion slide 30, racks 31 and 32, pivot post 33, and pinion gear 34. The base member 29 contains a longitudinal slot and a hole that accommodates pivot post 33 about which it may rotate freely. The longitudinal outer surfaces on either side of the slot of the base member 29 are relatively smooth and parallel allowing the rack and pinion slide 30 to move freely in the longitudinal direction. The rack and pinion slide 30 has a hole, post, or other means to accommodate the pinion gear and has groves, rails, or other means to accommodate and hold the racks in proper relationship. The hole, post, or other means of accommodating the pinion gear 34 has a hole in the center, is transparent, or has some other means to indicate or mark the center of the circle and is center indicating point 35. The ends of the racks have holes, are transparent, or have other means to be circle edge locators 36, 37, 38, and 39. These circle edge locators are equidistant from the line that runs through the circle center locator 35 and is perpendicular to the longitudinal direction of the base member 29.

Figure 4:
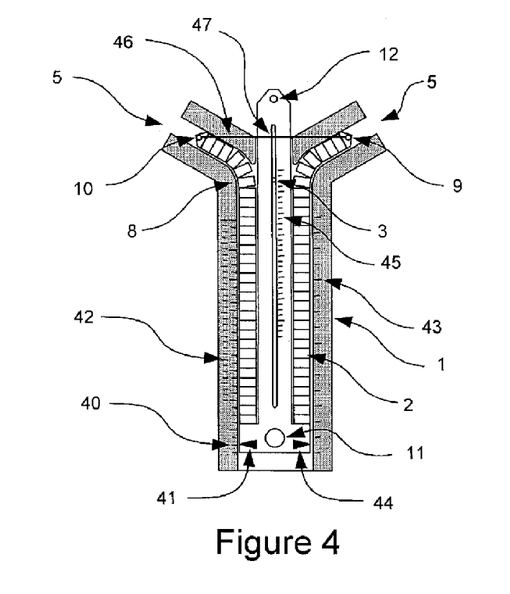
FIG. 4 is a plan view of the measuring apparatus according to the present invention.

As shown in FIG. 4, a set of measurement marks 40, are located on the base member 1 adjacent to the longitudinal portion of a medial cavity 4 commencing near the posterior end of the base member 1, where the posterior end is defined as the end of the base member 1 that is furthest away from the lateral portions 5 of the medial cavity. The spacing of the set of scale markings 40 is specifically based on the units of measurement desired and the amount of movement of the extendible member 2 and its opposing flexible members 8 relative to the base unit 1, such that the measure indicia attributed to the scale mark that is most adjacent to a measurement marker 41 located on the opposing flexible member 8 near it's posterior end indicates the size of the circle that is being measured when the circle edge locators (hereinafter referred to as point locators) 3, 9, and 10 are positioned at the edge of the circle.

Units indicia and corresponding spacing of the set of scale markings 40 for the size of a circle being measured may take the form of any number of units such as radius, diameter, or square area, they may also be of various systems of measurement such as SAE or metric units, as all of these describe the size of a circle. The number of marks in the set of scale markings may be varied depending on the accuracy or readability desired. In order to extend the utility of a single apparatus, a plurality of sets of scale markings may be located on the apparatus each indicating different units. The plurality of sets of scale markings may be adjacent to other scale markings and use the same measurement marker such as sets of scale markings 40 and 42 which both use measurement marker 41 or may be directly adjacent to their own measurement mark such as the set of measurement markings 43 shown adjacent to measurement mark 44. Further extending the utility of the apparatus, a plurality of sets of scale markings may also be located on the medial member of extendible member 2, such as the set of scale markings 45, and may use the first point locator 3 as the measurement marker.

Because the ends of the opposing flexible members 8 move in equal and opposite lateral direction and equal longitudinal direction in response to the longitudinal movement of the extendible member 2, any of the plurality of sets of scale markings described above may be spaced and labeled such that when the point locators 9 and 10 are positioned over two points to be measured, the appropriate measure mark will be adjacent to the mark or marks of said plurality of sets of scale markings that indicate the distance between two points.

An intersection member 46 is located between the point locators 9, 10 on the anterior ends of the flexible portions 8 to allow locating the mid point between two points. The intersection member 46 may be comprised of any material that will describe a straight when aligned between the point locators 9, 10. The intersection member 46 will move longitudinally with the point locators 9, 10 on the end of the flexible portions 8 as they extend laterally and longitudinally in response to the extension of the extendible member 2. One embodiment of the intersection member 46 is a length of elastic material such as a rubber band that has its ends attached to the respective point locators 9 and 10 in a manor so as to be slightly stretched when the point locators 9 and 10 are at their closest relative position when the extendible member 2 is retracted thereby keeping the rubber band straight so as to describe a straight line. The rubber band embodiment of extension line 46 will stretch laterally and move longitudinally as the point locators 9 and 10 move in equal and opposing lateral direction and equal longitudinal direction in response to the longitudinal extension of the extendible member 2. Because of said equal and opposite lateral movement of the point locators 9 and 10, the intersection member 46 will remain perpendicular to the center portion of the extendible member 2 as it moves longitudinally relative to the base unit 1. The mid point between the point locators 9 and 10 will be somewhere along the line 6 that bisects the medial cavity 4. A means of indicating said line 6 is to place a mid point indicator on the extendible member 2, such as a printed line or a slot for a pivot post 3 located at the first point locator. An intersection point 47 between said mid point indicator and the intersection member 46 will be created that is at the mid-point between the point locators 9 and 10. By adjusting the extendible member 2 and orienting the base member 1 to a position where the point locators 9 and 10 are at two respective points of interest, such as the ends of a line, or edge of a page, the mid-point between the two points of interest is accurately located by the intersection point 47. Having the said mid point indicator indicated by a slot in the center portion of the extendible member 2 allows the user to mark the located mid-point with a pencil, scribe, or other drawing tool. Other embodiments of the intersection member will be described later.

Figure 5:
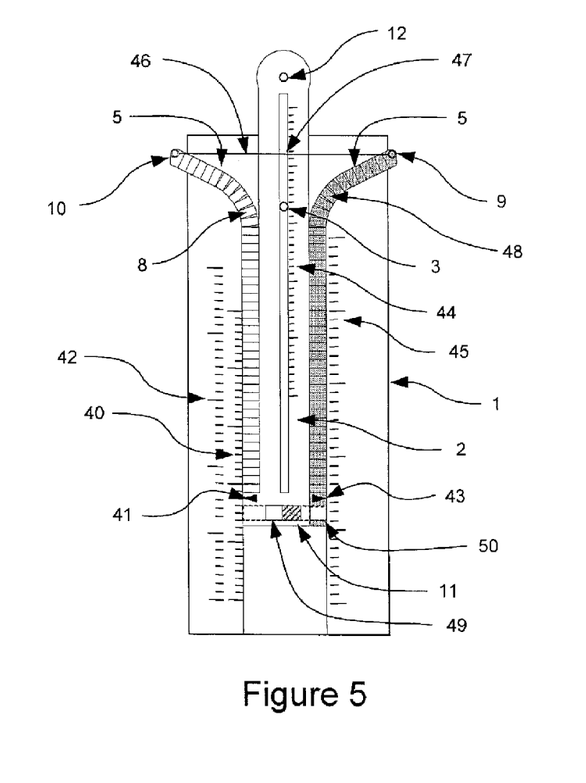
FIG. 5 is a plan view of another embodiment of the measuring apparatus according to the present invention.

FIG. 5 shows one of the flexible members 8 as made to be independently slidable. This flexible member 48 may slide freely in the longitudinal portion 4 and lateral portion 5 of the medial cavity relative to both the base member 1, and the medial member 2, or, may be locked to the extendible member 2 by a lock member. One embodiment of the lock member is a locking pin 49 which may incorporate the adjustment knob 11. The locking pin 49 is laterally oriented and slidably attached to the posterior end of the extendible member 2. A laterally oriented lock passageway 50 through the posterior end of slidable flexible member 48 is situated such that it aligns with the extendible member locking pin 49, in such a manor that when the extendible member locking pin 49 is positioned to engage lock passageway 50, the slidable flexible member 48 becomes fixed to the extendible member so as to perform identically as an opposing flexible member 8.

Figure 6:
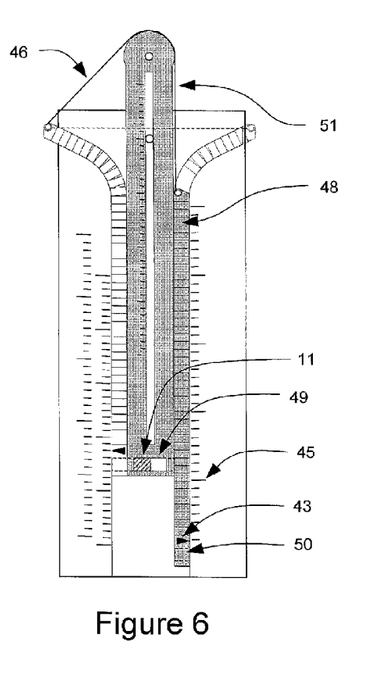
FIG. 6 is a plan view of still another embodiment of the measuring apparatus according to the present invention.

FIG. 6 illustrates the extendible member locking pin 49 disengaged from the slidable flexible member 48, the intersection member 46 wrapped around the end of the anterior end of the extendible member 2, and the slidable flexible member 48 retracted into the longitudinal cavity 4 to just where the point locator 9 is not being re-directed laterally by the lateral cavity 5, but where any anterior direction movement of the slidable flexile member 48 could cause the end of the slidable flexible member 48 to enter the lateral cavity 5 to where the point locator 9 would begin lateral movement. At this position of the slidable flexile member 48, measurement mark 43 is adjacent the scale mark of the set of scale markings 45 that in indicates zero angle. As previously discussed the scale markings may be spaced to any of a desired unit measure of angles, such as degrees or radians. The anterior end of the flexible member 2 and the point locator of the slidable flexible member 48 are constructed such when the slidable flexible member 48 is in the aforementioned retracted position, the rotatable segment 51 of the intersection member 46 that extends from the end of the extendible member 2 to the slidable flexible member 48 is parallel to the straight edge of the medial member 2. When the rotatable segment 51 is placed parallel to the first of two lines to be measured while the slidable flexible member 48 is in the aforementioned retracted position, the angle between the first and second of two lines to be measured can be found by extending the slidable flexible member in the anterior direction to where the rotatable segment 51 of the intersection member 46 is parallel to the second of the two lines to be measured.

Figure 7:
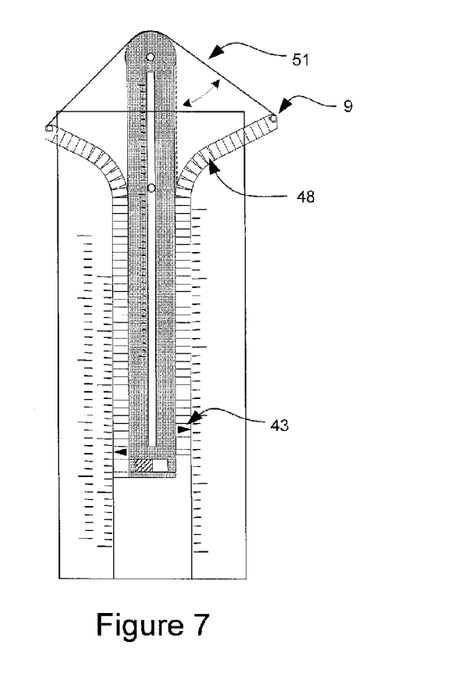
FIG. 7 is a plan view of yet another embodiment of the measuring apparatus according to the present invention.

FIG. 7 illustrates how the rotatable segment 51 of the intersection member 46 rotates about the anterior end of the extendible member 2 when the slidable flexible member 48 is extended in the longitudinally anterior direction so that the anterior end of the slidable flexible member 48 enters and is re-directed by the lateral cavity 5, when the extendible member 2 is maintained in a particular position that relates to the spacing of the angle scale markings 45. When the rotatable segment 51 of the intersection member 46 is positioned parallel to the second of two lines to be measured for the angle between them as discussed in the paragraph above, the measure mark 43 on the posterior end of the slidable flexible member is adjacent the mark of the set of scale markings 45 that indicates the angle between the two lines to be measured.

Figure 8:
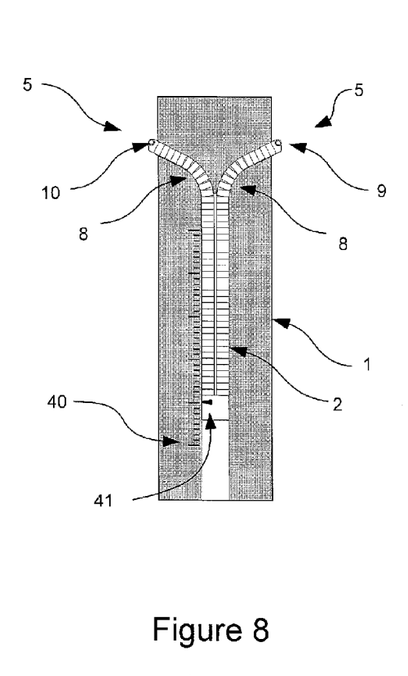
FIG. 8 is a plan view of another embodiment of the measuring apparatus according to the present invention.

A basic embodiment of the invention is shown in FIG. 8. In this embodiment of the invention, the extendible member 2 comprises two opposing flexible members 8 with no medial member, that slidably engage the longitudinal cavity 4 and lateral cavities 5 of the medial cavity of base member 1. A set of scale markings 40, are located on the base member 1 adjacent to the longitudinal cavity 4 commencing near the posterior end of the base member 1, where the posterior end is defined as the end of the base member 1 that is furthest away from the lateral cavities 5. The spacing of the set of scale markings 40 is specifically based on the units of measurement desired and the amount of movement of the extendible member 2 and its opposing flexible portions 8 relative to the base unit 1, such that the label of the scale mark that is most adjacent to a measurement mark 41 located on the opposing flexible member 8 near it's posterior end indicates the distance between two points when the point locators 9, 10 are positioned at said points to be measured.

Figure 9:
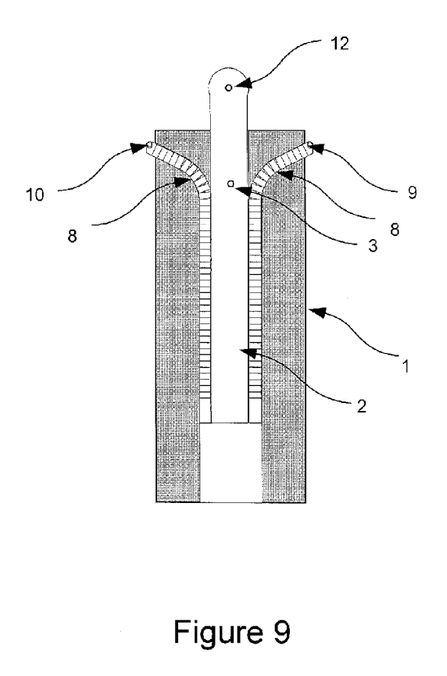
FIG. 9 is a plan view of another embodiment of the measuring apparatus according to the present invention.

Another basic embodiment of the invention is shown in FIG. 9. In this particular embodiment, the extendible member 2 comprises the medial member and two opposing flexible members 8 with point locators 9 and 10 on their respective ends. The extendible member 2 may be made of a generally transparent material so that point locator 3 may be seen through the extendible member. The configuration of the extendable member 2, cavities, and point locators 3, 9, 10 are such that the point locator 12 is located at the center of a circle when the point locators 3, 9, 10 are positioned at the edge of the circle being measured.

Figure 10:
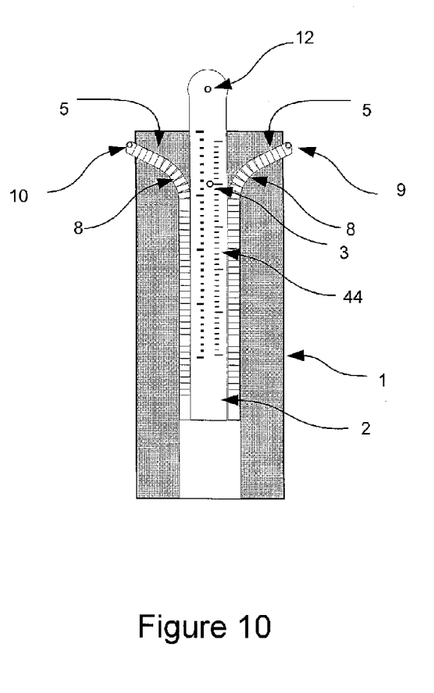
FIG. 10 is a plan view of another embodiment of the measuring apparatus according to the present invention.

Yet another basic embodiment of the invention is shown in FIG. 10. Scale markings 44 are located on the medial member of the extendable member 2. The distance between the scale markings and labeled indicia are such that the scale marking that indicates the size of the circle being measured is most adjacent the point locator 3 when the point locators 3, 9, 10 are positioned at the edge of said circle. By having the circle center locator 12 be a passageway through the extendable member sized to engage a drawing instrument such as a pen or pencil, the apparatus may be used as a compass to draw a circle of a desired size when the extendable member 2 is extended to where the scale marking corresponding to the desired circle size is positioned adjacent to the point locator 3, and the apparatus is rotated about the point locator 3 that is maintained a particular point which thereby becomes the center of the circle that is drawn. The scale markings 44 may alternatively be spaced and labeled such that the scale marking that indicates the depth of a cavity being measured is most adjacent the point locator 3 when the anterior edge of base member 1 is positioned at the edge of said cavity, and the medial member of the extendable member 2 is extended into the cavity until its anterior end touches the bottom of the cavity.

Figure 11:
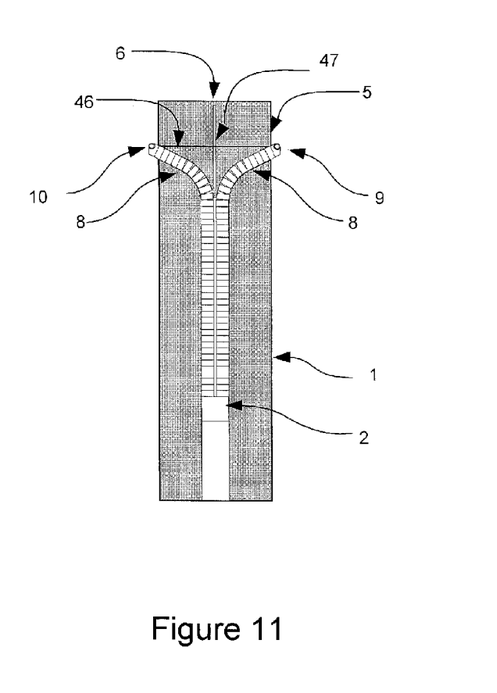
FIG. 11 is a plan view of another embodiment of the measuring apparatus according to the present invention.

Yet another basic embodiment of the invention is shown in FIG. 11. In this embodiment, the extendible member 2 comprises of the two opposing flexible members 8. The intersection member 46 is located between the point locators 9, 10 and engages the anterior ends of the flexible portions 8. The intersection member 46 provides a way of indicating the longitudinal line 6 on either the base member 1, or the extendible member 2, such as a printed line or the slot for a pivot post 3, an intersection point 47 between the longitudinal line 6 and the intersection member 46 is created that is at the mid-point between the point locators 9 and 10. By adjusting the extendible member 2 and orienting the base member 1 to a position where the point locators 9 and 10 are at two respective points of interest, such as the ends of a line, or point of a page, the mid-point between the two points is accurately located by the intersection point 47. Having the said longitudinal line 6 indicated by a slot in the medial member of the extendible member 2 allows the user to mark the located mid-point with a pencil, scribe, or other drawing tool.

Figure 12:
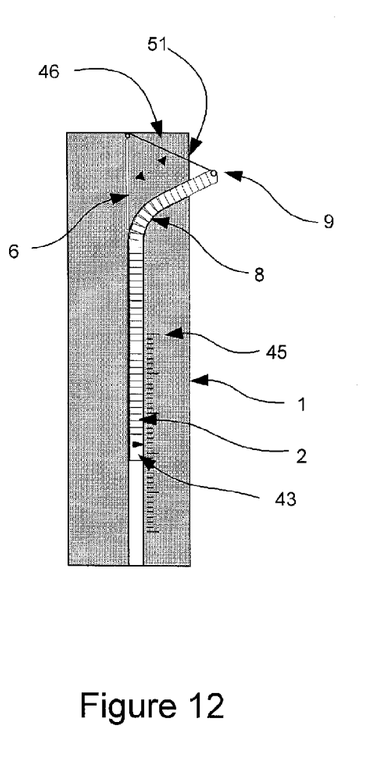
FIG. 12 is a plan view of another embodiment of the measuring apparatus according to the present invention.

Yet another embodiment of the invention is shown in FIG. 12. This embodiment of the measuring apparatus includes a single flexible member 48. The rotatable segment 51 of the intersection member 46 engages the anterior end of the base member 1 and the anterior end of the flexible member near point locator 9. Scale markings 45 along the longitudinal cavity 4 are spaced and labeled such that the scale mark that indicates the angle between two lines is most adjacent the measurement mark 44 that is located at the posterior end of the flexible member 8, when the longitudinal line 6 is positioned either collinear with or parallel to the first of the said two lines, and the independently slidable flexible member 9 is positioned so that the line segment 51 is either collinear with or parallel to the second of said two lines being measured.

The structures described above may be included in various combinations in a single apparatus designed to perform a variety of measuring functions.

Figure 13:
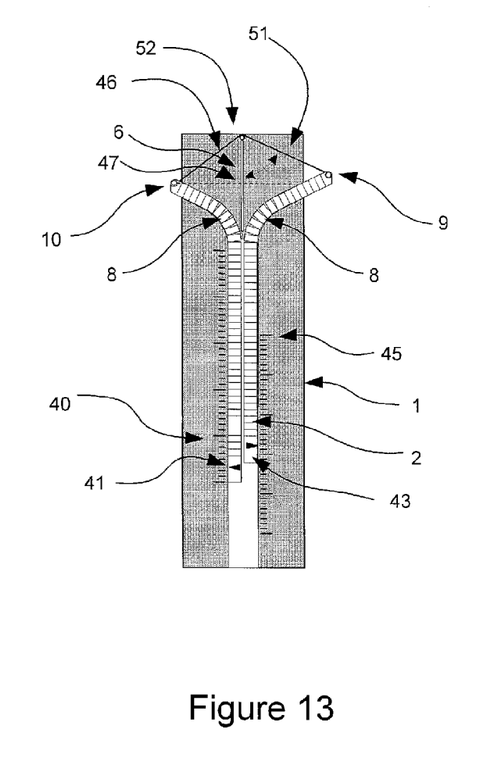
FIG. 13 is a plan view of another embodiment of the measuring apparatus according to the present invention.

FIG. 13 illustrates a combination of the base member 1 with the medial cavity. In this combination, the extendable member 2 includes opposing flexible members 8 and 48 with point locator 10 and 9 located on their respective ends, intersection member 46 that engages point locator 10, 9 and selectively engages a point of rotation 52 at the end of the base member 1. This combination of the measurement device also includes, a mid point indicator located on the base member 1, distance measurement markings 40, measurement mark 41, angle scale markings 45, and measurement mark 43. In this combination, the distance scale marking that indicates the distance between two points being measured is most adjacent to point distance measurement mark 41 when the extendable member 2 and independently slidable flexible member 8 are extended in equal amounts to where the point locator 10 is positioned at the first of said two points, and the point locator 9 is positioned at the second of said two points.

When the intersection member 46 is not selected to engage the anterior end of the base member 1 so that the intersection member is a straight line between point locators 10 and 9, the point of intersection 47 of the intersection member and the longitudinal line 6 is at the midpoint between two points when the point locator 10 is positioned at the first of two points, and the point locator 9 is positioned at the second of said two points. When the intersection member 46 is selected to engage the anterior end of the base member 1 so that the intersection member forms a straight line segment between point locator 10, the anterior end of the base member 1, and the point locator 9, the scale marking that indicates the angle between two lines is most adjacent the measurement mark 43 that is located at the posterior end of the independently slidable flexible member 48, when the longitudinal line 6 is positioned either collinear with or parallel to the first of the said two lines, and the independently slidable flexible member 9 is positioned so that the line segment 51 is either collinear with or parallel to the second of said two lines being measured.

Figure 14:
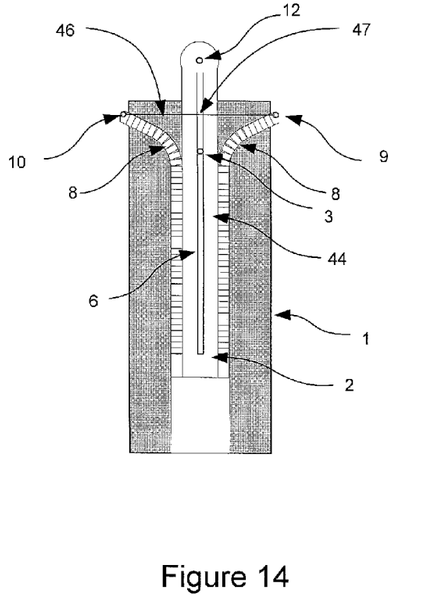
FIG. 14 is a plan view of another embodiment of the measuring apparatus according to the present invention.

FIG. 14 illustrates a combination of the measuring apparatus including a base member 1 having a medial cavity, and an extendable member 2 including a medial member and two opposing flexible portions 8. The measuring apparatus also includes point locators 9 and 10 located on the anterior end of the opposing flexible portions and a point locator 3 located on the base member 1. The point locator 3 positioned on the base member 1 is preferably visible through the mid point indicator 6. The mid point indicator is defined by a longitudinal slot. A circle center locator 12 is located on the anterior end of the medial member of the extendable member 2, and an intersection member 46 engages the point locators 9 and 10 on the anterior ends of the opposing flexile portions 8. When the point locators 9 and 10 are placed at two points of interest, the intersection 47 of the intersection member 46 and the longitudinal slot of the mid point indicator 6 is located at the midpoint between the two points. When the point locators 3, 9, and 10 are positioned at the edge of a circle, the circle center locator 12 is positioned at the center of the circle.

Figure 15:
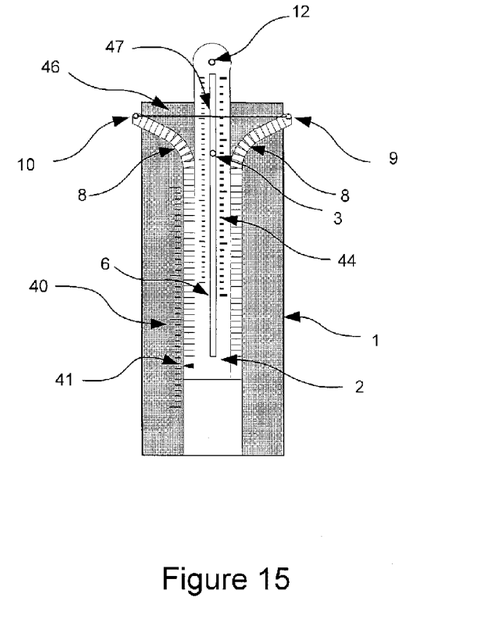
FIG. 15 is a plan view of another embodiment of the measuring apparatus according to the present invention.

FIG. 15 illustrates the measuring apparatus being defined as a combination of the base member 1 and the extendible member 2. The extendible member 2 in this combination includes marking media, or measurement marking indicia, on the two opposing flexible portions 8, and the intersection member 46 that engages the ends of the flexible portions. Accordingly, a straight line may be defined between point locators 9 and 10. The point locator 3 may be used as a corresponding measurement mark for the three sets of scale markings When the point locators 9 and 10 are positioned at two points of interest, the intersection 47 of the intersection member 46 and the mid point indicator locates the mid point between the two points. Additionally, the scale marking used to indicate the distance between the two points is positioned most adjacent the measurement mark corresponding to a first of the three sets of scale markings. When the point locators 3, 9 and 10 are positioned at the edge of a circle, the point locator 12 is positioned at the center of the circle, which may be marked by a writing instrument that engages the passageway through the extendible member that defines circle center point 12. In this position, the scale marking on a second of the three sets of scale marking that indicates the size of the circle is most adjacent its corresponding measurement mark.

A circle of a desired size may be drawn using this combination of the measuring apparatus. More particularly, the circle may be drawn when the extendable member is positioned to where the scale mark of a circle of a desired size of the second of the three sets of scale markings is most adjacent its corresponding measurement mark, and point locator 3 is maintained at a desired point, and a drawing instrument engages the circle center locator 12, and the apparatus is rotated about the point locator 3. The point locator 3 may be comprised of a pivot post that engages the longitudinal slot, and may extend below the base member 1 so as to provide a fixed point of rotation for ease of drawing the circle. When the base member 1 is placed at the edge of a cavity to be measured and the extendable member 2 is extended into the cavity until the end of the medial member touches the bottom of the cavity, the scale marking on the third of the three sets of scale markings that indicates the depth of the cavity is most adjacent the measurement mark corresponding to this set of scale markings.

Figure 16:
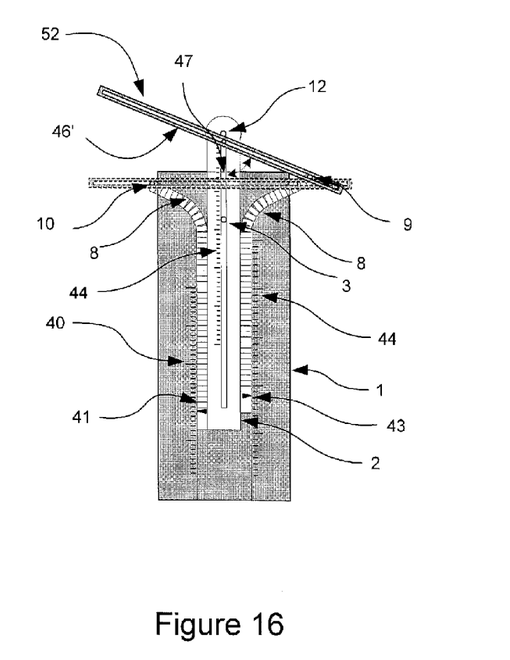
FIG. 16 is a plan view of another embodiment of the measuring apparatus according to the present invention.

FIG. 16 illustrates yet another embodiment of the intersection member 46' that includes a solid bar 52 with a lateral slot. Pins located on the anterior ends of the flexible portions 8 and the medial member of extendable member 2 slidably engage the slot. The intersection member is configured to be selectively engaged to either the pin on the medial member of the extendable member 2 or the pin on the opposing flexible member 8 of the extendable member 2. When the slot on bar 52 engages the pins on the opposing flexible portions of the extendable member 2, a straight edge of the bar will be perpendicular with the line the runs between the point locators 9 and 10 so as to create the point of intersection 47 with the longitudinal slot in the medial member of the extendable member.

Figure 17:
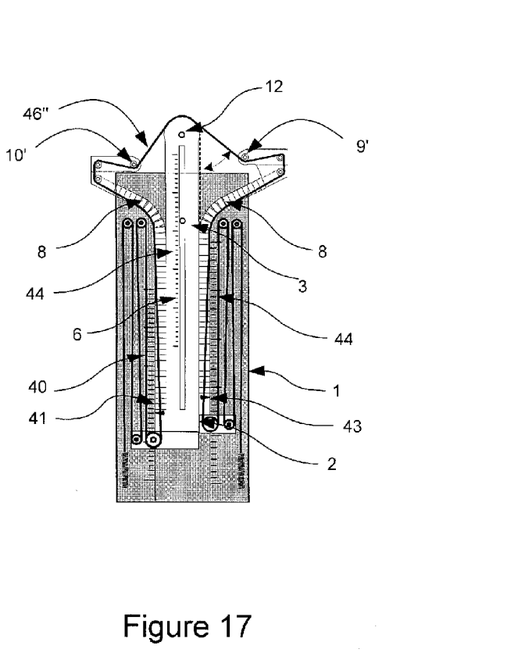
FIG. 17 is a plan view of another embodiment of the measuring apparatus according to the present invention.

FIG. 17 illustrates a further embodiment of the intersection member 46". In this embodiment, the line is flexible but non-elastic such as a steel wire, for example. To accommodate the movement of the extendable member and its portions while still maintaining enough tension for the appropriate segments of the line to be the required straight line, a line pay-out and tensioning system is included. The line is routed around pulley points located on the base member 1 and extendable member 2 and held in tension with a spring or elastic material and can be selectively set to engage the anterior end of the center member of the extendable member or not, to perform the intersection member functions described earlier. The illustrated "block and tackle" configure will have the appropriate number of segments to pay-out the proper amount of line. Other embodiments of tensioning systems for non-elastic line, such as a spool of line held in torque that will pay out line to accommodate the displacement of the extendable member, may be employed.

FIG. 15 also illustrates another embodiment of the ends of the flexible members where the point locators are located on portions of the flexible portions that extend inward toward the medial member of the extendable member. This improves the range of measurement capable with the apparatus by allowing the flexible members to have adequate engagement with the lateral cavities 5 of the base member 1 to provide the required angular re-direction, yet allow the point locators 9 and 10 on the end of the flexible portions to be very close so as to measure small distances between two point or very small circles when the extendable member 12 is fully retracted.

A method aspect of the present invention is for using a measuring apparatus for measuring an object. The method may include slidably moving an extendible member within a medial cavity of a base member. The base member may comprise a point locator, and the extendible member may comprise a medial member having a mid point indicator defined by an elongate medial passageway. The extendible member may also have a point locator defined by a passageway formed through an end portion thereof, and a pair of opposing flexible members connected to the medial member. Each one of the pair of opposing flexible members may have point locators defined by passageways formed through end portions thereof.

The method may also include engaging an intersection member connected to the point locators on the pair of opposing flexible members with portions of the base member. The method may further include locating a measurement to determine a predetermined measurement of the object using a plurality of sets of measurement marks carried by at least one of the base member and the extendible member.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A measuring apparatus for measuring an object, the measuring apparatus comprising:
   a base member including a portion having a medial cavity, and a point locator defined by a passageway formed through an end portion thereof;
   an extendible member that slidably engages the medial cavity of said base member, said extendible member comprising
      a medial member having a mid point indicator defined by an elongate medial passageway, and a point locator defined by a passageway formed through an end portion thereof, and
      a pair of opposing flexible members connected to the medial member, each one of the pair of opposing flexible members having point locators defined by passageways formed through end portions thereof;
   an intersection member connected to the point locators on the pair of opposing flexible members; and
   a plurality of sets of measurement marks carried by at least one of said base member and said extendible member relating to a predetermined measurement of the object to be measured.

2. An apparatus according to claim 1 wherein the predetermined measurement is a distance between two points; wherein at least one of the measurement marks relates to length; and wherein the distance between two points is indicated by the measurement mark when the opposing point locators on said flexible members are aligned with the respective two points.

3. An apparatus according to claim 1 wherein the predetermined measurement is a size of a circle; wherein at least one of the measurement marks relates to the size of the circle; and wherein the size of the circle is indicated by the measurement mark when the point locator on the base member and the opposing point locators on the flexible members are aligned with an outer edge of the circle.

4. An apparatus according to claim 1 wherein the predetermined measurement is a location of a center of a circle; and wherein the center of the circle is indicated by the point locator on the medial member when the point locator on the base member and the opposing point locators on the flexible members are aligned with an outer edge of the circle.

5. An apparatus according to claim 1 wherein the predetermined measurement is a location of a midpoint between two points; and wherein the midpoint between the two points is indicated by an intersection between said intersection member and the mid point indicator when the point locators on the flexible members are aligned with the respective two points.

6. An apparatus according to claim 1 wherein the predetermined measurement is a depth of a cavity; wherein at least one of the measurement marks relates to the depth of the cavity; and wherein the depth of the cavity is indicated by the measurement mark when the end of the medial member is touching the bottom of the cavity and the opposing point locators on the flexible members are aligned with the outer edge of the cavity.

7. An apparatus according to claim 1 wherein said intersection member comprises a string of elastic material held in tension.

8. An apparatus according to claim 7 further comprising opposing spring members carried by said base member and connected to end portions of the string of elastic material, and a plurality of pulleys carried by said base member and said extendible member, the string of elastic material engaging the plurality of pulleys to maintain tension on the string of elastic material as said extendible member slidably engages said base member.

9. An apparatus according to claim 1 wherein the pair of opposing flexible members comprises a first flexible member that is fixedly connected to said base member, and a second flexible member that is selectively extended with the medial member.

10. An apparatus according to claim 9 further comprising a lock member for fixing the first flexible member to said base member.

11. An apparatus according to claim 10 wherein the predetermined measurement is an angle between two lines; wherein at least one of the sets of measurement marks relates to the angle between two lines; and wherein the angle between the two lines is indicated by the at least one set of measurement marks when the point locator on the first flexible member is aligned with a portion of a first one of the two lines so that said intersection member is positioned parallel with the first one of the two lines, and the point locator on the second flexible member is aligned with a portion of the second one of the two lines so that the intersection member is parallel with the second line.

12. A method of using a measuring apparatus for measuring an object, the method comprising:
   slidably moving an extendible member within a medial cavity of a base member, the base member comprising a point locator, the extendible member comprising a medial member having a mid point indicator defined by an elongate medial passageway, and a point locator defined by a passageway formed through an end portion thereof, and a pair of opposing flexible members connected to the medial member, each one of the pair of opposing flexible members having point locators defined by passageways formed through end portions thereof;
   engaging an intersection member connected to the point locators on the pair of opposing flexible members with portions of the base member; and
   locating a measurement to determine a predetermined measurement of the object using a plurality of sets of measurement marks carried by at least one of the base member and the extendible member.

13. A method according to claim 12 wherein the predetermined measurement is a distance between two points; wherein at least one of the measurement marks relates to length; and wherein the distance between two points is indicated by the measurement mark when the opposing point locators on the flexible members are aligned with the respective two points.

14. A method according to claim 12 wherein the predetermined measurement is a size of a circle; wherein at least one of the measurement marks relates to the size of the circle; and wherein the size of the circle is indicated by the measurement mark when the point locator on the base member and the opposing point locators on the flexible members are aligned with an outer edge of the circle.

15. A method according to claim 12 wherein the predetermined measurement is a location of a center of a circle; and wherein the center of the circle is indicated by the point locator on the end of the medial member when the point locator on the base member and the opposing point locators on the flexible members are aligned with an outer edge of the circle.

16. A method according to claim 12 wherein the predetermined measurement is a location of a midpoint between two points; and wherein the midpoint between the two points is indicated by an intersection between the intersection member and the mid point indicator when the point locators on the flexible members are aligned with the respective two points.

17. A method according to claim 12 wherein the predetermined measurement is a depth of a cavity; wherein at least one of the measurement marks relates to depth; and wherein the depth of the cavity is indicated by the measurement mark when the end of the medial member touches the bottom of the cavity and the opposing point locators on the flexible members are aligned with the outer edge of the cavity.

18. A method according to claim 12 wherein the intersection member comprises a string of elastic material held in tension; and further comprising maintaining tension on the string of elastic member using opposing spring members carried by the base member connected to end portions of the string of elastic material, and engaging the string of elastic material with a plurality of pulleys carried by the base member.

19. A method according to claim 12 further comprising fixing a first one of the opposing flexible members to the base member, and selectively extending a second one of the flexible member with the medial member; and wherein fixing the first one of the opposing flexible members comprises locking the first flexible member to the base member.

20. A method according to claim 19 wherein the predetermined measurement is an angle between two lines; wherein at least one of the sets of measurement marks relates to the angle between two lines; and wherein the angle between the two lines is indicated by the at least one set of measurement marks when the point locator on the first flexible member is aligned with a portion of a first one of the two lines so that the intersection member is positioned parallel the first one of the two lines, and the point locator on the second flexible member is aligned with a portion of the second one of the two lines so that the intersection member is parallel with the second line.

* * * * *